United States Patent
Sawai et al.

(10) Patent No.: US 8,923,881 B2
(45) Date of Patent: Dec. 30, 2014

(54) COMMUNICATION CONTROL METHOD, COMMUNICATION DEVICE, AND PROGRAM

(75) Inventors: Ryo Sawai, Tokyo (JP); Ryota Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 703 days.

(21) Appl. No.: 13/144,738

(22) PCT Filed: Jan. 12, 2010

(86) PCT No.: PCT/JP2010/050231
§ 371 (c)(1),
(2), (4) Date: Jul. 15, 2011

(87) PCT Pub. No.: WO2010/084801
PCT Pub. Date: Jul. 29, 2010

(65) Prior Publication Data
US 2011/0275322 A1    Nov. 10, 2011

(30) Foreign Application Priority Data
Jan. 26, 2009 (JP) .................. 2009-014681

(51) Int. Cl.
*H04W 72/00* (2009.01)
*H04W 72/08* (2009.01)
*H04W 16/14* (2009.01)

(52) U.S. Cl.
CPC ............ *H04W 72/085* (2013.01); *H04W 16/14* (2013.01)
USPC ..................... 455/454; 455/452.1; 455/452.2; 455/453; 455/67.11; 455/67.13; 455/41.2; 455/446; 455/447; 455/448; 455/507; 455/509; 455/515; 455/516; 370/445; 370/447; 370/448

(58) Field of Classification Search
USPC ........... 455/452.1, 452.2, 453, 454, 507, 509, 455/512, 513, 67.11, 67.13, 68, 69, 515, 455/516, 41.2, 446, 447, 448; 370/329, 370/332, 333, 341, 445, 447, 448
See application file for complete search history.

(56) References Cited

U.S. PATENT DOCUMENTS 6,553,060 B2 * 4/2003 Souissi et al. ................. 375/219
7,813,318 B2 * 10/2010 Hu ................ 370/329
(Continued)

FOREIGN PATENT DOCUMENTS

CN    101310465 A    11/2008
EP    2237588        10/2010
(Continued)

OTHER PUBLICATIONS

Nov. 26, 2013, Japanese Office Action issued for related JP application no. 2010-547461.

(Continued)

*Primary Examiner* — Tuan A Tran
(74) *Attorney, Agent, or Firm* — Sherr & Jiang, PLLC

(57) ABSTRACT

To start secondary use of a spectrum without causing an adverse effect on a communication service for primary usage, provided is a communication control method including the steps of acquiring data related to a communication environment surrounding a first communication device at the first communication device, determining that a second communication service using a part or whole of a spectrum assigned to a first communication service is available when the acquired data related to the communication environment satisfies a first condition, and permitting usage of the second communication service when the data related to the communication environment satisfies a second condition at the first communication device or a second communication device.

16 Claims, 13 Drawing Sheets

(56) References Cited

U.S. PATENT DOCUMENTS

| | | | |
|---|---|---|---|
| 7,920,538 B2* | 4/2011 | Gerhardt et al. | 370/343 |
| 7,965,641 B2* | 6/2011 | Ben Letaief et al. | 370/237 |
| 8,155,033 B2* | 4/2012 | Chaudhri et al. | 370/278 |
| 8,279,767 B2* | 10/2012 | Kang et al. | 370/252 |
| 8,335,183 B2* | 12/2012 | Nguyen | 370/329 |
| 8,411,766 B2* | 4/2013 | Wu et al. | 375/260 |
| 2006/0063543 A1 | 3/2006 | Matoba et al. | |
| 2007/0026868 A1* | 2/2007 | Schulz et al. | 455/454 |
| 2007/0178840 A1 | 8/2007 | Deguchi | |
| 2007/0253394 A1 | 11/2007 | Horiguchi et al. | |
| 2007/0259681 A1* | 11/2007 | Cheng et al. | 455/522 |
| 2008/0151856 A1 | 6/2008 | Glick et al. | |
| 2008/0261639 A1 | 10/2008 | Sun et al. | |
| 2009/0161610 A1 | 6/2009 | Kang et al. | |

FOREIGN PATENT DOCUMENTS

| | | |
|---|---|---|
| JP | 2006-094005 | 4/2006 |
| JP | 2006-526368 | 11/2006 |
| JP | 2007-202039 | 8/2007 |
| JP | 2007-300419 | 11/2007 |
| JP | 2008-206044 | 9/2008 |
| JP | 2009-512326 | 3/2009 |
| JP | 2010-521105 | 6/2010 |
| WO | WO2007/031959 | 3/2007 |
| WO | WO 2007/043827 A1 | 4/2007 |
| WO | WO2007/135639 | 11/2007 |
| WO | WO2008/086243 | 7/2008 |
| WO | WO2008/109641 | 9/2008 |

OTHER PUBLICATIONS

Ota, et al., An OFDM Subcarrier Mapping Based Information Exchanging Method for Cooperative Sensing, IEICE Technical Report, SR2008-7, p. 37-42, vol. 108, No. 62, Japan.

Jan. 20, 2014, Extended European Search Report for related EP application No. 10733408.8.

Jul. 2, 2013 Office Action for CN201080004987.4.

IEEE802.22, WG on WRAN's, [on-line], [Search on Jan. 5, 2009], Internet <URL:http://www.ieee802.org/22/>.

Second Report and Order and Memorandum Opinion and Order, Federal Communication Commission, FCC 08-260, [on-line], [Search on Jan. 5, 2009], Internet <URL:http://hraunfoss.fcc.gov/edocs_public/attachmatch/FCC-08-260A1.pdf>.

International Search Report from the Japanese Patent Office for International Application No. PCT/JP2010/050231, mailing date Mar. 16, 2010.

* cited by examiner

COMMUNICATION CONTROL METHOD, COMMUNICATION DEVICE, AND PROGRAM

TECHNICAL FIELD

The present invention relates to a communication control method, a communication device, and a program.

BACKGROUND ART

In recent years, discussions have been taking place to enable a spectrum assigned for primary usage to be used for a secondary communication service depending on the use condition of the spectrum. For example, the standard specification for allowing an unused channel contained in a spectrum of the U.S. digital TV broadcast (TV white spaces) to be available for a radio communication has been studied in the IEEE802.22 working group (cf. Non-Patent Literature 1). Further, according to the report from the FCC (Federal Communications Commission) in November 2008, the discussions are directed toward permitting secondary usage of TV white spaces by using communication devices that have been authorized by fulfilling a certain criterion (cf. Non-Patent Literature 2). Further, there are moves, led by the EU, afoot to universally allocate a dedicated control channel called the CPC (Cognitive Pilot Channel) for making DSA (Dynamic Spectrum Access). Furthermore, technological studies for a secondary usage system that makes DSA are also being progressed in IEEE SCC (Standards Coordinating Committee) 41. Further, as another example of secondary usage of a spectrum, there is a case where a secondary communication system is constructed using a simpler communication protocol in a service area of a majority system that uses a non-licensed spectrum. For example, it is assumed that when a WiFi (registered trademark) system that uses an ISM (Industry-Science-Medical) band is a majority system, a secondary communication system is constructed using another simple communication protocol in its service area.

In such secondary usage of a spectrum, it is necessary to sense the surrounding communication environment in advance and confirm that a communication service related to secondary usage (which is referred to hereinafter as a second communication service) does not cause an adverse effect on a communication service related to primary usage (which is referred to hereinafter as a first communication service).

CITATION LIST

Patent Literature

Non-Patent Literature 1: "IEEE802.22 WG on WRANs", [online], [Searched on Jan. 5, 2009], Internet <URL:http://www.ieee802.org/22/>

Non-Patent Literature 2: "Second Report and Order and Memorandum Opinion and Order", [online], [Searched on Jan. 5, 2009], Internet <URL:http://hraunfoss.fcc.gov/edocs_public/attachmatch/FCC-08-2601.pdf>

SUMMARY OF INVENTION

Technical Problem

However, no case has been reported which presents a specific procedure to start secondary usage of a spectrum with checking the surrounding communication environment in advance so as not to cause an adverse effect such as a decrease in communication quality on a communication service related to primary usage.

In light of the foregoing, the present invention is designed to provide a novel and improved communication control method, communication device and program capable of starting secondary usage of a spectrum without causing an adverse effect on a communication service related to primary usage.

Solution to Problem

According to one aspect of the present invention, there is provided a communication control method including the steps of acquiring data related to a communication environment surrounding a first communication device at the first communication device, determining that a second communication service using a part or whole of a spectrum assigned to a first communication service is available when the acquired data related to the communication environment satisfies a first condition, and permitting usage of the second communication service when the data related to the communication environment satisfies a second condition at the first communication device or a second communication device.

Further, when the data related to the communication environment does not satisfy the second condition, sensing of a communication environment by a plurality of communication devices may be recommended to the first communication device.

Further, when usage of the second communication service is permitted, a beacon for inviting a user to participate in the second communication service may be transmitted from the first communication device to nearby communication devices.

Further, when a response to the beacon is received, a communication mode to be used for the second communication service may be decided by the first communication device based on information contained in the response.

Further, when the second communication device has authority to permit usage of the second communication service, the data related to the communication environment may be transmitted from the first communication device to the second communication device.

Further, when wired connection is available between the first communication device and the second communication device, the data related to the communication environment may be transmitted using the wired connection.

Further, when a communication is possible using the first communication service between the first communication device and the second communication device, the data related to the communication environment may be transmitted using the first communication service.

Further, in the in the step of permitting, reliability of the data related to the communication environment may be evaluated by comparing the data related to the communication environment with a communication history in the first communication service, and usage of the second communication service may be permitted according to an evaluation result of the reliability.

Further, in the step of permitting, it may be verified that a communication device to use the second communication service is not a device that has performed an unauthorized act in the spectrum assigned to the first communication service in past times, and usage of the second communication service may be permitted according to a result of the verification.

According to another aspect of the present invention, there is provided a communication device including a determination unit that determines that a second communication service using a part or whole of a spectrum assigned to a first communication service is available when data related to a communication environment surrounding its own device satisfies a first condition, wherein the determination unit, when determining that the second communication service is available, makes a request for permitting usage of the second communication service to a device having authority to permit usage of the second communication service.

According to another aspect of the present invention, there is provided a program causing a computer controlling a communication device to function as a determination unit that determines that a second communication service using a part or whole of a spectrum assigned to a first communication service is available when data related to a communication environment surrounding its own device satisfies a first condition, and, when the determination unit determines that the second communication service is available, the determination unit makes a request for permitting usage of the second communication service to a device having authority to permit usage of the second communication service.

Advantageous Effects of Invention

As described above, according to a communication control method, a communication device and a program according to the present invention, secondary usage of a spectrum can be started without causing an adverse effect on a communication service related to primary usage.

DESCRIPTION OF EMBODIMENTS

Figure 1:
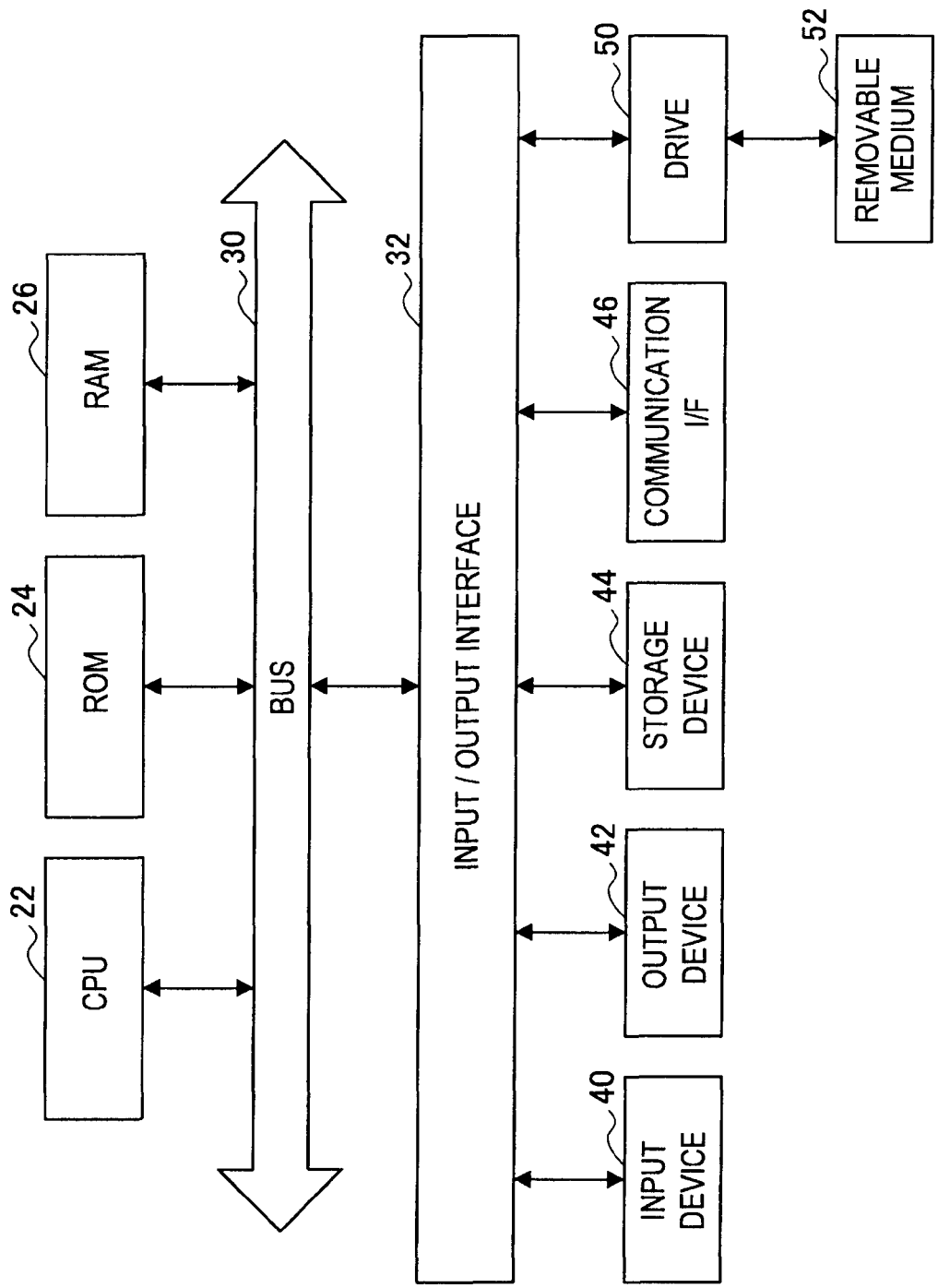
FIG. 1 is a block diagram showing a hardware configuration example of a communication device according to one embodiment.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, embodiments of the present invention will be described in the following order.

1. Functional Classification for Secondary Usage of Spectrum
2. Hardware Configuration Example of Communication Device
3. Configuration Example of Communication System
4. Flow of Communication Control Process
5. Selection of Communication Protocol Prior to Start of Secondary Usage
6. Example of Data Transmitted and Received between Nodes
7. Summary 1. Functional Classification for Secondary Usage of Spectrum Firstly, the principal functions (FC: Function Class) to be incorporated into communication devices that join a system in order to implement secondary usage of a spectrum are listed below. A communication device that joins a system incorporates one or more than one of the seven functions (FC1 to FC7) listed below.

FC1: Secondary communication authentication node
FC2: Primary communication relay node
FC3: Advanced determination node
FC4: Determination node
FC5: Smart sensor node
FC6: Sensor node
FC7: Communication node

[1-1. Secondary Communication Authentication Node (FC1)]

The secondary communication authentication node (FC1) permits start or extension of the second communication service in accordance with a specific condition for permission conforming to the spectrum policy when it is determined that secondary usage of a spectrum is available by the advanced determination node or the determination node, which are described later. The secondary communication authentication node may check whether a terminal identifier, an authentication identifier, a device identifier, a sensor identifier or the like which is transmitted from the advanced determination node or the determination node is contained in a list of identifiers that have made an unauthorized use of a frequency in the past, for example. If any of the above identifiers is contained in the list of identifiers that have made an unauthorized use, for example, the secondary communication authentication node can reject start or extension of the second communication service. Further, if a base station that controls the traffic of the first communication service is the secondary communication authentication node, the base station may refer to history of user traffic or the like and grant permission for secondary usage for a time period or a place with many unoccupied channels. It is thereby possible to make some unoccupied channels open and enable effective use of a spectrum. Further, the secondary communication authentication node may generate, acquire or update information to be used for determination about the availability of secondary usage by the advanced determination node or the determination node and supply the information to the advanced determination node or the determination node. The information to be used for determination about the availability of secondary usage contains community based or service area based regulatory information such as a power level usable for sensing and system information (such as a band and a bandwidth in use) provided by a base station of an adjacent cell, for example. The secondary communication authentication node can thus serve as a so-called coordinator of the second communication service.

There are two kinds of secondary communication authentication nodes: a permanent secondary communication authentication node and a temporary secondary communication authentication node. The permanent secondary communication authentication node is a communication device that is authorized to coordinate the second communication service because it meets a predetermined criterion set by statute or the like. On the other hand, the temporary secondary communication authentication node is a communication device that receives authority from the permanent secondary communication authentication node because it meets a specific criterion according to a communication environment or the like and thereby temporarily makes coordination of the second communication service within the range of the granted authority (for example, within the range of the limited frequency channels or resource blocks, or within the range of a transmission power under a specific maximum value). Herein, "coordination" of a communication service may contain allocation of resources (i.e. scheduling) for the second communication service, for example. The temporary secondary communication authentication node may perform resource allocation for the second communication service in a cooperative manner by exchanging scheduling information each other with the permanent secondary communication authentication node, for example.

[1-2. Primary Communication Relay Node (FC2)]

The primary communication relay node (FC2) serves as a pseudo base station or access point that, when connected with a communication network related to primary usage (which is referred to hereinafter as a first communication network), allows nearby nodes to use the first communication service.

[1-3. Advanced Determination Node (FC3)]

The advanced determination node (FC3) determines whether extension of a communication network related to secondary usage (which is referred to hereinafter as a second communication network) is available based on a secondary communication profile acquired from the determination node, which is described later. The secondary communication profile typically contains sensed data of a communication environment (including link data statistically calculated from the sensed data). The secondary communication profile may further contain scheduling information for each of the second communication network. Furthermore, the secondary communication profile may contain an identifier of the spectrum policy assigned to each determination node or the like. For example, the advanced determination node may determine that the second communication network is extendable when a criterion for starting secondary usage (a sensing level or a database) coincides with a nearby second communication network. Alternatively, the advanced determination node may determine that the second communication network is extendable when all networks satisfy the strictest sensing level. Further, the advanced determination node may determine that the second communication network is extendable when a database is accessible by using a common channel between networks. Furthermore, when communication devices to be connected with each other are included in two adjacent networks, the advanced determination node may determine the availability of extension of the second communication network with conditions that the purpose is limited to relaying or multi-hopping data between the communication devices. Furthermore, the advanced determination node may determine that extension of the second communication network is available when the maximum transmission power can be raised without causing an adverse effect on the first communication service by utilizing interference control technology based on beam forming or transmission power control. If the advanced determination node determines that extension of the second communication network is available, it makes a request for permitting extension of the second communication network to the secondary communication authentication node. Typically, the advanced determination node has a function of the determination node, which is described later, also. It should be noted that, when the advanced determination node and the secondary communication authentication node exist on a physically same device, a communication between the advanced determination node and the secondary communication authentication node is performed as a communication between logical functions (or it may be omitted). On the other hand, when the advanced determination node and the secondary communication authentication node exist on physically different devices, a communication between the advanced determination node and the secondary communication authentication node is performed using either a wireless link or a wired link. The wireless link herein may be a wireless link based on the first communication service, for example. Further, the wired link may be a link either on a private network (e.g. core network etc.) or on a public network (e.g. ADSL etc.).

[1-4. Determination Node (FC4)]

The determination node (FC4) determines whether secondary usage of a spectrum is available or not according to a specific condition for availability conforming to the spectrum policy based on sensed data sensed or acquired by the smart sensor node or the sensor node, which are described later. For example, the determination node may determine that secondary usage of a spectrum is available when a power level sensing result of a spectrum as a target of secondary usage is lower than a power sensing level defined in the above-described regulatory information. Alternatively, the determination node may determine that secondary usage of a spectrum is available when secondary usage is permitted for a spectrum as a target of secondary usage as a result of making inquiry to a data server, which is described later, for example. Further, the determination node may determine that secondary usage of a spectrum is available when a power level sensing result of a spectrum as a target of secondary usage is lower than a power sensing level indicated by data obtained from the data server described above, for example. Note that the power level sensing result of a spectrum as a target of secondary usage may be an averaged value of A/D sampling output values, for example. If the determination node determines that secondary usage of a spectrum is available, it makes a request for permitting start of the second communication service to the secondary communication authentication node. Then, if start of the second communication service is permitted by the secondary communication authentication node, the determination node invites users of the second communication service by transmitting beacons to nearby communication devices, for example, and starts the second communication service. The beacons transmitted from the determination node may be used by the nearby communication devices for detection, synchronization, acquisition of system information and the like regarding the second communication service. For example, a primary synchronization signal and a secondary synchronization signal in a cellular communication system, signals on a PBCH (Physical Broadcast Channel) or the like are an example of the above-described beacons.

The determination node thus serves as an engine for cognitive radio that switches from the first communication service to the second communication service. Further, the determination node generates the secondary communication profile in response to an instruction from the above-described advanced determination node and transmits the profile to the advanced determination node. It should be noted that, similarly to the above description about the advanced determination node, a communication between the determination node and the secondary communication authentication node can be also performed as a communication between logical functions (in the case of being on the same device. However, the above processes may be omitted in this case) or as a communication using a wireless link or a wired link (in the case of being on different devices).

[1-5. Smart Sensor Node (FC5)]

The smart sensor node (FC5) acquires sensed data about a communication environment stored in each node from the sensor node or the smart sensor node located in the nearby vicinity of its own device. The smart sensor node may further add sensed data sensed by itself to the acquired sensed data (or use the sensed data sensed by itself only). The smart sensor node thus serves as an extended sensor capable of acquiring sensed data necessary for determination of secondary usage in collaboration with the nearby nodes. Further, the smart sensor node transmits the stored sensed data in response to an instruction from another smart sensor node or a determination node.

[1-6. Sensor Node (FC6)]

The sensor node (FC6) senses the communication environment surrounding its own device and generates sensed data. As described later in detail, the sensed data is typically data indicating the surrounding communication environment relating to the first communication service. For example, a power level or energy of received signals or scheduling information of the first communication service may be used as data indicating the surrounding communication environment. The sensor node thus serves as a sensor that senses sensed data necessary for determination of secondary usage. Further, the sensor node transmits the generated sensed data in response to an instruction from the smart sensor node or the determination node.

[1-7. Communication Node (FC7)]

The communication node (FC7) performs a communication using the second communication service when secondary usage of a spectrum is available. The communication node thus serves as a general communication device. Note that a communication protocol that is used for the second communication service may be a desired communication protocol such as IEEE802.11a/b/g/n/s, Zigbee or WiMedia, for example.

[1-8. Scope of Term "Secondary Usage"]

In this specification, the term "secondary usage" typically means utilization of an additional or alternative communication service (the second communication service) using a part or whole of a spectrum assigned to the first communication service as described above. In this context about the meaning of the term "secondary usage", the first communication service and the second communication service may be communication services of different types or communication services of the same type. The communication services of different types may be two or more different types of communication services which are selectable from arbitrary communication services such as a digital TV broadcasting service, a satellite communication service, a mobile communication service, a wireless LAN access service, and a P2P (Peer To Peer) connection service. On the other hand, the communication services of the same type may contain a relationship between a service of macro-cell provided by a communication carrier and a service of femto-cell operated by users or MVNO (Mobile Virtual Network Operator) in a mobile communications service, for example. Additionally, the communication services of the same type may also contain a relationship between a service provided by a base station and a service provided by a relay station (relay node) to cover a spectrum hole in a communication service in conformity to WiMAX, LTE (Long Term Evolution), LTE-A (LTE-Advanced) or the like, for example. Further, the second communication service may be a service utilizing a plurality of fragmentary frequency bands aggregated using spectrum aggregation technology. Furthermore, the second communication service may be a supplementary communication service provided by femto-cells, relay stations or small or medium sized base stations that provide a smaller service area than base stations which are located within a service area provided by the base station. The subject matter of each embodiment of the present invention described in this specification is widely applicable to such various types of modes of secondary usages.

2. Hardware Configuration Example of Communication Device

Next, a hardware configuration of a communication device that incorporates one or more than one of FC1 to FC7 listed in the previous section is described hereinbelow.

FIG. 1 is a block diagram showing an example of a hardware configuration of the communication device described above. The communication device shown in FIG. 1 by way of illustration includes a CPU (Central Processing Unit) 22, a ROM (Read Only Memory) 24, a RAM (Random Access Memory) 26, a bus 30, an input/output interface 32, an input device 40, an output device 42, a storage device 44, a communication interface (I/F) 46 and a drive 50.

In FIG. 1, the CPU 22 controls the operation of a general-purpose computer as a whole. The ROM 24 stores programs executed by the CPU 22, data and so on. The RAM 26 temporarily stores a program or data during execution of processing by the CPU 22.

The CPU 22, the ROM 24 and the RAM 26 are connected with one another through the bus 30. The input/output interface 32 is also connected to the bus 30.

The input/output interface 32 connects the CPU 22, the ROM 24 and the RAM 26 with the input device 40, the output device 42, the storage device 44, the communication interface 46 and the drive 50.

The input device 40 receives an instruction or information input from a user through a button, a switch, a lever, a mouse, a keyboard, a touch panel or the like, for example. The output device 42 outputs information to a user through a display device such as a CRT (Cathode Ray Tube), a liquid crystal display or an OLED (Organic Light Emitting Diode), a light emitting device such as a lamp, or an audio output device such as a speaker, for example. The storage device 44 is made up of a hard disk drive or a flash memory, for example, and stores programs, data and so on. The communication interface 46 mediates communication processing for the first communication service or the second communication service. A removable medium 52 is loaded to the drive 50 according to need.

Each of the functions FC1 to FC7 listed in the previous section may be implemented as software, for example. In the case where each function is implemented as software, a program constituting software is stored in the ROM 24 or the storage device 44 shown in FIG. 1, loaded to the RAM 26 upon execution and then executed by the CPU 22, for example. Thus, the CPU 22 can act as the secondary communication authentication unit (FC1), the primary communication relay unit (FC2), the advanced determination unit (FC3), the determination unit (FC4), the smart sensor unit (FC5), the sensor unit (FC6), or the communication unit (FC7). Alternatively, each function may be implemented as hardware by using a dedicated processor which is additionally mounted to the communication device.

3. Configuration Example of Communication System

Next, an example of a communication system which is composed of a communication device that incorporates one or more than one of the functions FC1 to FC7 is described hereinbelow.

[3-1. First System Configuration Example]

Figure 2:
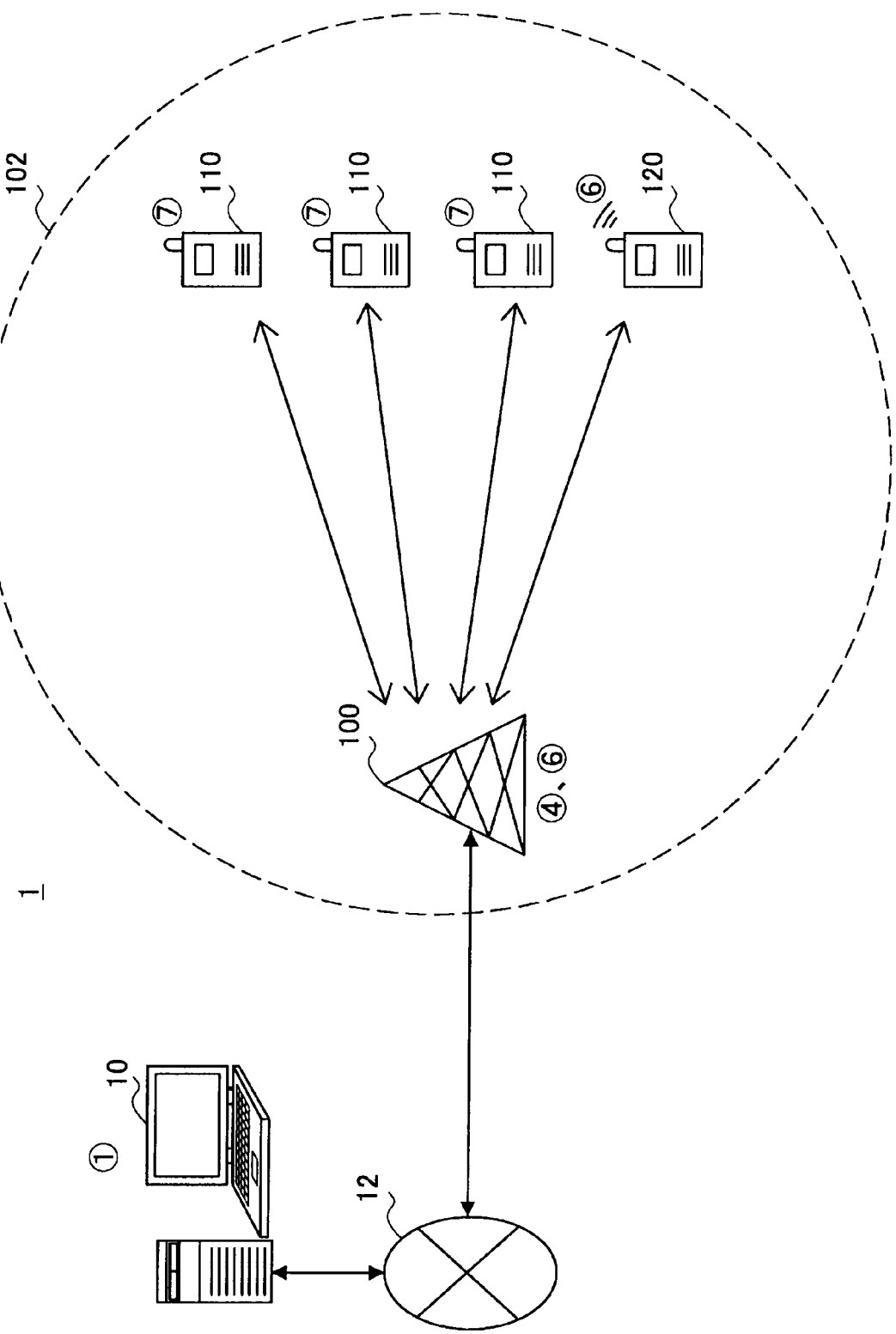
FIG. 2 is a schematic diagram showing a first configuration example of a communication system according to one embodiment.
Figure 3:
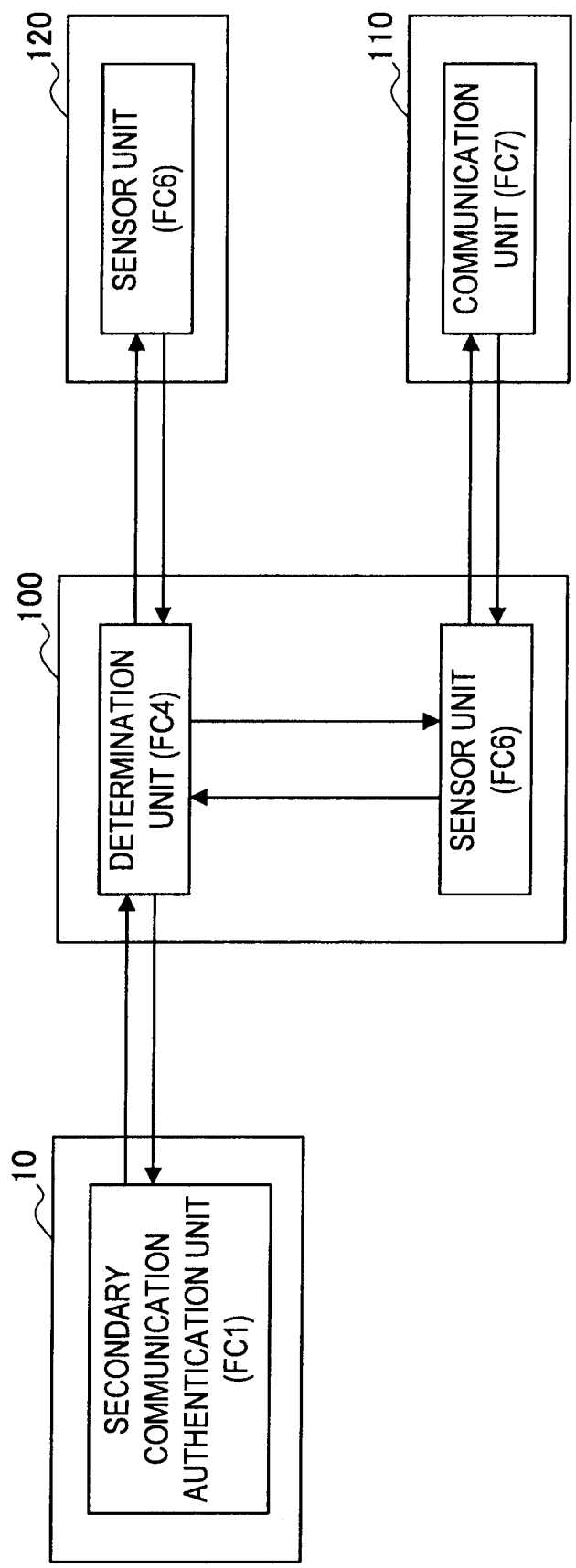
FIG. 3 is a block diagram showing an example of a functional layout in the communication system of FIG. 2.

FIG. 2 is a schematic diagram showing a configuration of a communication system 1 according to one embodiment of the present invention. Circled numerals in FIG. 2 correspond to the numbers of the functions (FC) described above. Further, FIG. 3 is a block diagram showing an example of a functional layout between devices in the communication system 1 shown in FIG. 2.

Referring to FIG. 2, the communication system 1 includes a server 10, a base station 100, three communication devices 110, and a sensor device 120. The three communication devices 110 and the sensor device 120 are located inside an area 102 where a communication with the base station 100 is possible. Further, the base station 100 is connected to the server 10 through a network 12, which is a wired network.

The server 10 provides the first communication service to communication devices located in the nearby vicinity of the base station 100 by using the base station 100 connected over the network 12. The first communication service may be a digital TV broadcast service, for example, or another kind of communication service. Further, the server 10 may serve also as a data server that integrally stores data related to a communication environment of the first communication service. In this case, data about a frequency currently in use for each location in a communication area, use history data of a frequency for each location, prediction data related to a condition of traffic predicted from the use history data or the like, for example, is stored in the server 10.

Further, in the communication system 1, the server 10 operates as the secondary communication authentication node (FC1) described above. Specifically, when the server 10 receives a request for permitting usage of the second communication service from the base station 100 operating as the determination node, which is described later, the server 10 can permit start of the second communication service in accordance with the above-described condition for permission.

The base station 100 provides the above-described first communication service to the devices located inside the area 102. Further, the base station 100 operates as the determination node (FC4) and the sensor node (FC6) described above. Specifically, the base station 100 communicates with the communication devices 110 located in the nearby vicinity of its own device, senses the communication environment and generates sensed data, for example. Further, the base station 100 acquires sensed data from the sensor device 120, integrates the data with sensed data sensed in its own device, and then determines whether secondary usage of a spectrum is available in accordance with the above-described condition for availability, for example. Furthermore, when the base station 100 determines that secondary usage of a spectrum is available, the base station 100 makes a request for permitting secondary usage of a spectrum to the server 10, which is the secondary communication authentication node. Then, when secondary usage of a spectrum is permitted, the base station 100 starts the second communication service.

The communication devices 110 operate as the communication node (FC7) described above. Specifically, the communication devices 110 transmit and receive radio signals to and from the base station 100. The base station 100 can thereby sense the communication environment in the area 102.

The sensor device 120 operates as the sensor node (FC6) described above. Specifically, the sensor device 120 senses the communication environment surrounding its own device and generates sensed data. Then, the sensor device 120 transmits the generated sensed data to the base station 100. Note that the sensor device 120 may be omitted in the communication system 1.

By such a configuration of the communication system 1, the base station 100 can provide the second communication service to the communication devices 110 and the sensor device 120 by using an unused part (or whole) of the spectrum assigned to the first communication service.

[3-2. Second System Configuration Example]

Figure 4:
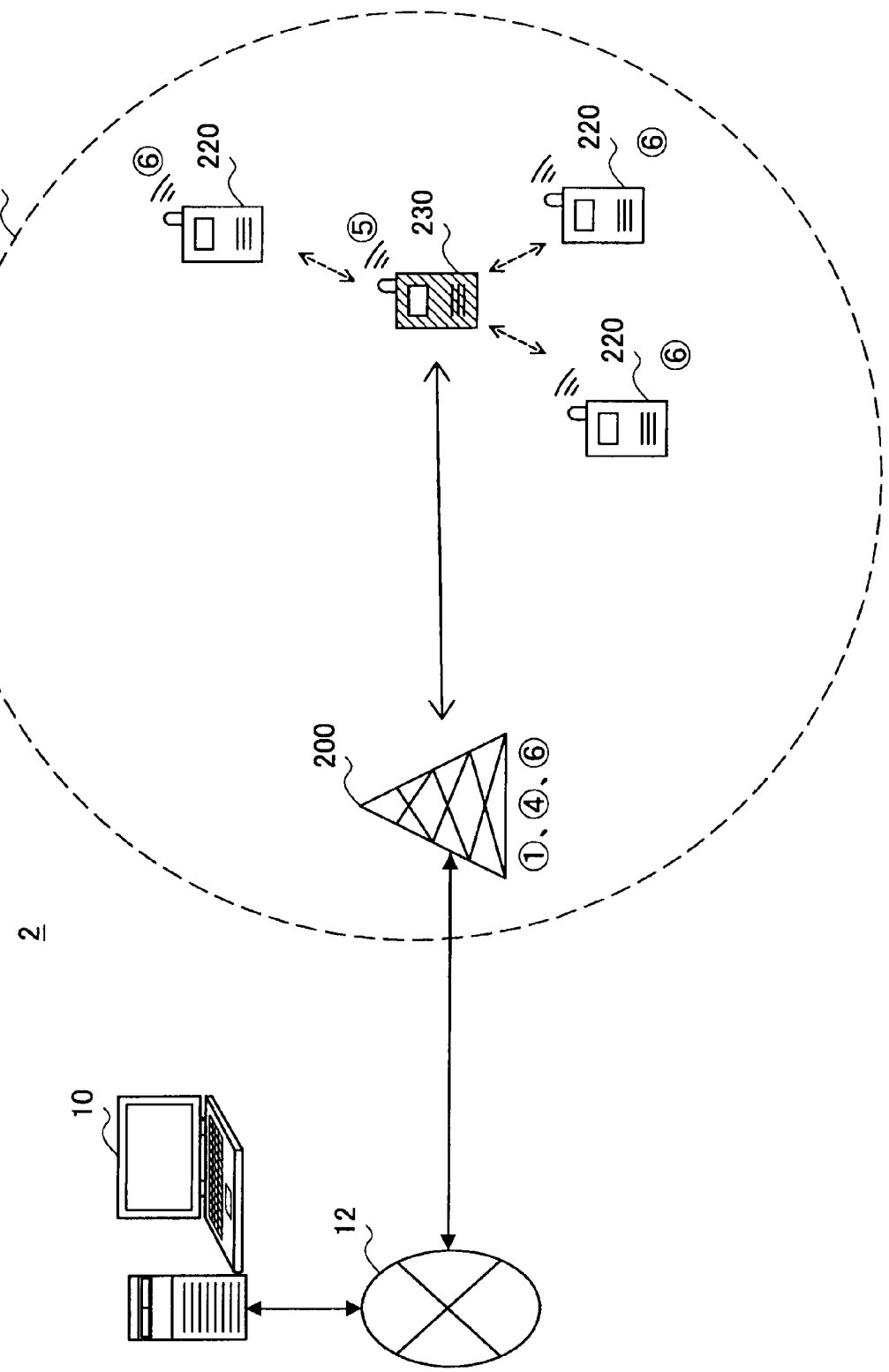
FIG. 4 is a schematic diagram showing a second configuration example of a communication system according to one embodiment.
Figure 5:
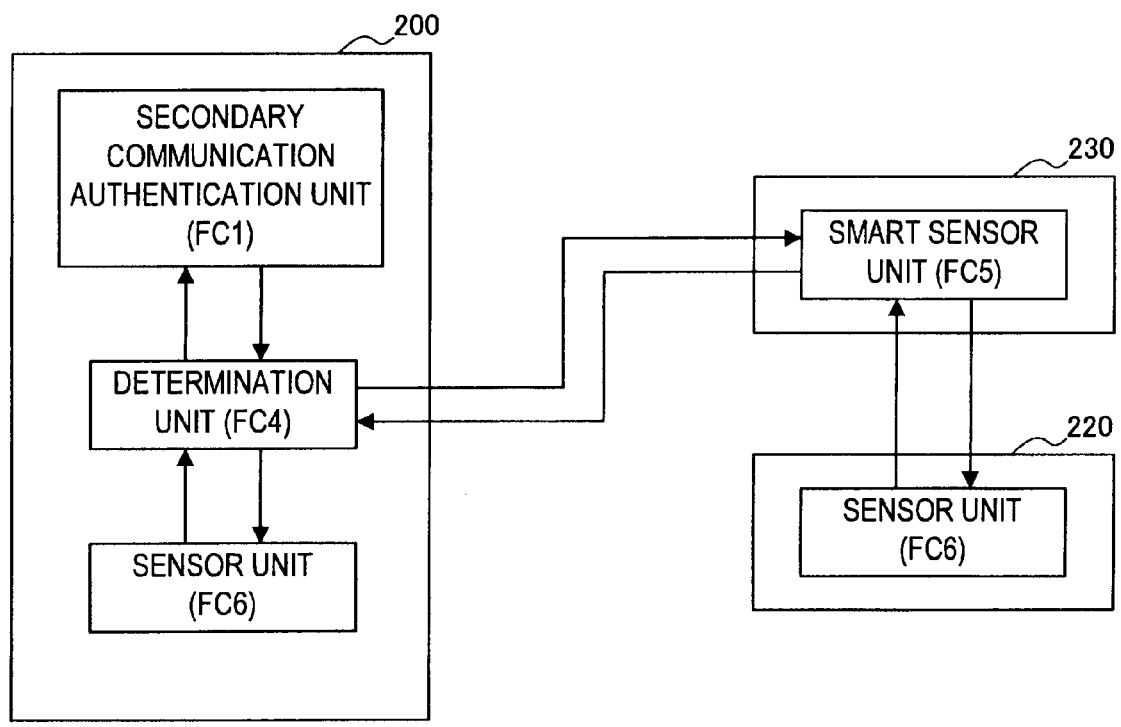
FIG. 5 is a block diagram showing an example of a functional layout in the communication system of FIG. 4.

FIG. 4 is a schematic diagram showing a configuration of a communication system 2 according to one embodiment of the present invention. Further, FIG. 5 is a block diagram showing an example of a functional layout between devices in the communication system 2 shown in FIG. 4.

Referring to FIG. 4, the communication system 2 includes a server 10, a base station 200, three sensor devices 220, and a smart sensor device 230. The three sensor devices 220 and the smart sensor device 230 are located inside an area 202 where a communication with the base station 200 is possible. Further, the base station 200 is connected to the server 10 through a network 12, which is a wired network.

The base station 200 can provide the first communication service to the devices located inside the area 202. Further, the base station 200 operates as the secondary communication authentication node (FC1), the determination node (FC4) and the sensor node (FC6) described above as shown in FIG. 5. Specifically, the base station 200 can acquire sensed data from the smart sensor device 230 located in the nearby vicinity of its own device, for example. Further, the base station 200 may communicate with the sensor devices 220 located in the nearby vicinity of its own device, sense a communication environment by itself and generate sensed data, for example. Then, the base station 200 determines whether secondary usage of a spectrum is available or not in accordance with the above-described condition for availability based on the sensed data acquired from the smart sensor device 230 and/or the sensed data sensed by itself, for example. Furthermore, when the base station 200 determines that secondary usage of a spectrum is available based on the sensed data, the base station 200 starts the second communication service.

The sensor devices 220 operate as the sensor node (FC6) described above. Specifically, in response to an instruction from the smart sensor device 230, for example, the sensor devices 220 sense the communication environment surrounding their own devices and generate sensed data. Then, the sensor devices 220 transmit the generated sensed data to the smart sensor device 230.

The smart sensor device 230 operates as the smart sensor node (FC5) described above. Specifically, the smart sensor device 230 gives an instruction for sensing of a communication environment to the sensor devices 220 in the nearby vicinity of its own device and acquires sensed data from the sensor devices 220. Further, the smart sensor device 230 may add sensed data obtained by sensing the surrounding communication environment of its own to the acquired data. At this time, the smart sensor device 230 may integrate a plurality of pieces of sensed data and generate one piece of sensed data. Then, the smart sensor device 230 transmits the sensed data to the base station 200.

By such a configuration of the communication system 2, the second communication service can be provided to the sensor devices 220 and the smart sensor device 230 by using an unused part (or whole) of the spectrum assigned to the first communication service. Further, even when the accuracy of the sensed data of the communication environment sensed by the base station 200 is low, the availability of secondary usage of a spectrum can be determined more appropriately by using the sensed data acquired from the smart sensor device 230.

[3-3. Third System Configuration Example]

Figure 6:
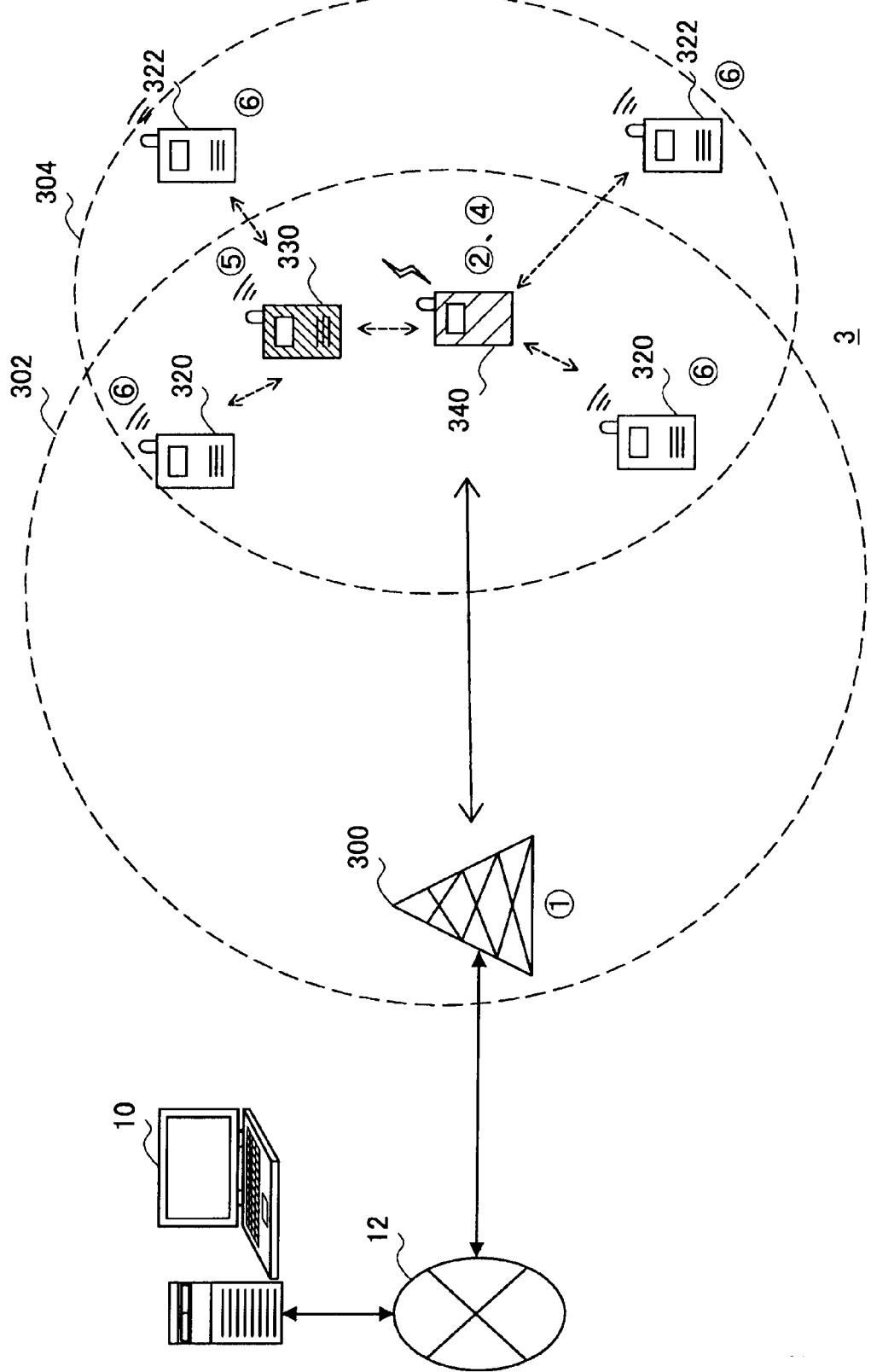
FIG. 6 is a schematic diagram showing a third configuration example of a communication system according to one embodiment.
Figure 7:
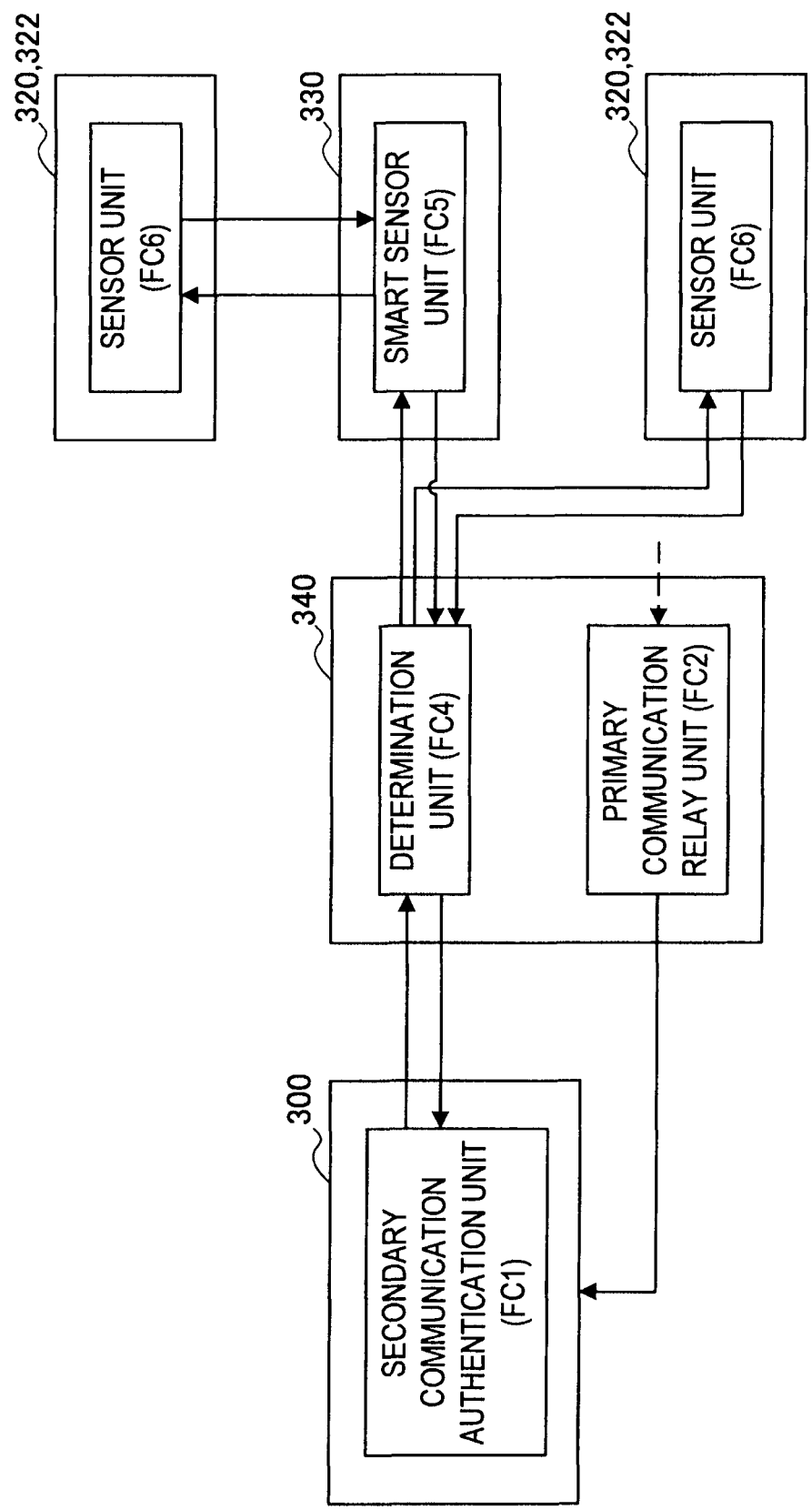
FIG. 7 is a block diagram showing an example of a functional layout in the communication system of FIG. 6.

FIG. 6 is a schematic diagram showing a configuration of a communication system 3 according to one embodiment of the present invention. Further, FIG. 7 is a block diagram showing an example of a functional layout between devices in the communication system 3 shown in FIG. 6.

Referring to FIG. 6, the communication system 3 includes a server 10, a base station 300, two sensor devices 320, two sensor devices 322, a smart sensor device 330, and a determination device 340. Among them, the two sensor devices 320, the smart sensor device 330 and the determination device 340 are located inside an area 302 where a communication with the base station 300 is possible. Further, the base station 300 is connected to the server 10 through a network 12, which is a wired network.

The base station 300 can provide the first communication service to the devices located inside the area 302. Further, the base station 300 operates as the secondary communication authentication node (FC1) described above. Specifically, when the base station 300 receives a request for permitting usage of the second communication service from the determination device 340 operating as the determination node, which is described later, the base station 300 can permit start of the second communication service in accordance with the above-described condition for permission.

The sensor devices 320 operate as the sensor node (FC6) described above. Specifically, the sensor devices 320 sense the communication environment surrounding their own devices and generate sensed data. Then, the sensor devices 320 transmit the generated sensed data to the smart sensor device 330 or the determination device 340. Likewise, the sensor devices 322 also operate as the sensor node (FC6) described above. Specifically, in response to an instruction from the smart sensor device 330 or the determination device 340, the sensor devices 322 sense the communication environment surrounding their own devices, generate sensed data, and transmit the generated sensed data to the smart sensor device 330 or the determination device 340.

The smart sensor device 330 operates as the smart sensor node (FC5) described above. Specifically, in response to an instruction from the determination device 340, the smart sensor device 330 acquires sensed data from the sensor devices 320 and 322 in the nearby vicinity of its own device. Further, the smart sensor device 330 adds sensed data obtained by sensing the surrounding communication environment of its own to the acquired data. Then, the smart sensor device 330 transmits the sensed data to the determination device 340.

The determination device 340 operates as the primary communication relay node (FC2) and the determination node (FC4) described above. Specifically, the determination device 340 can acquire sensed data from the sensor devices 320 and 322 and the smart sensor device 330 located in the nearby vicinity of its own device. Then, the determination device 340 determines whether secondary usage of a spectrum is available or not based on the acquired sensed data. When it is determined that secondary usage of a spectrum is available from the sensed data, the determination device 340 further makes a request for permitting start of secondary usage to the base station 300. At this time, the determination device 340 transmits the acquired sensed data, additionally obtained location data of its own device or the like to the base station 300. Then, when start of secondary usage is permitted according to the transmitted data, the determination device 340 starts the second communication service with a communication device located in the nearby vicinity of its own device (e.g. an area 304). Further, the base station 300 can temporarily grant authority for permitting secondary usage of a spectrum to the determination device 340 according to a communication environment. In this case, the determination device 340 operates as the temporary secondary communication authentication node described above, and starts the second communication service after confirming by itself that the sensed data satisfies the above-described condition for permission to permit start of secondary usage of a spectrum.

Further, the determination device 340 operates as the primary communication relay node, which is a pseudo base station or access point for the first communication service, and can relay a communication packet corresponding to the first communication service which is transmitted from the sensor device 322, for example, to the base station 300.

Note that, as shown in FIG. 6, the two sensor devices 322 are located outside the area 302 where radio signals can be transmitted to and received from the base station 300. Because the two sensor devices 322 are thus located in positions where a communication is not possible for the base station 300, it is difficult that the base station 300 provides the second communication service related to secondary usage to the two sensor devices 322. In view of this, according to the configuration of the communication system 2, the determination device 340 operates as the determination node and provides the second communication service targeting at the sensor devices 320 and 322 and the smart sensor device 330 located inside the area 304.

[3-4. Fourth System Configuration Example]

Figure 8:
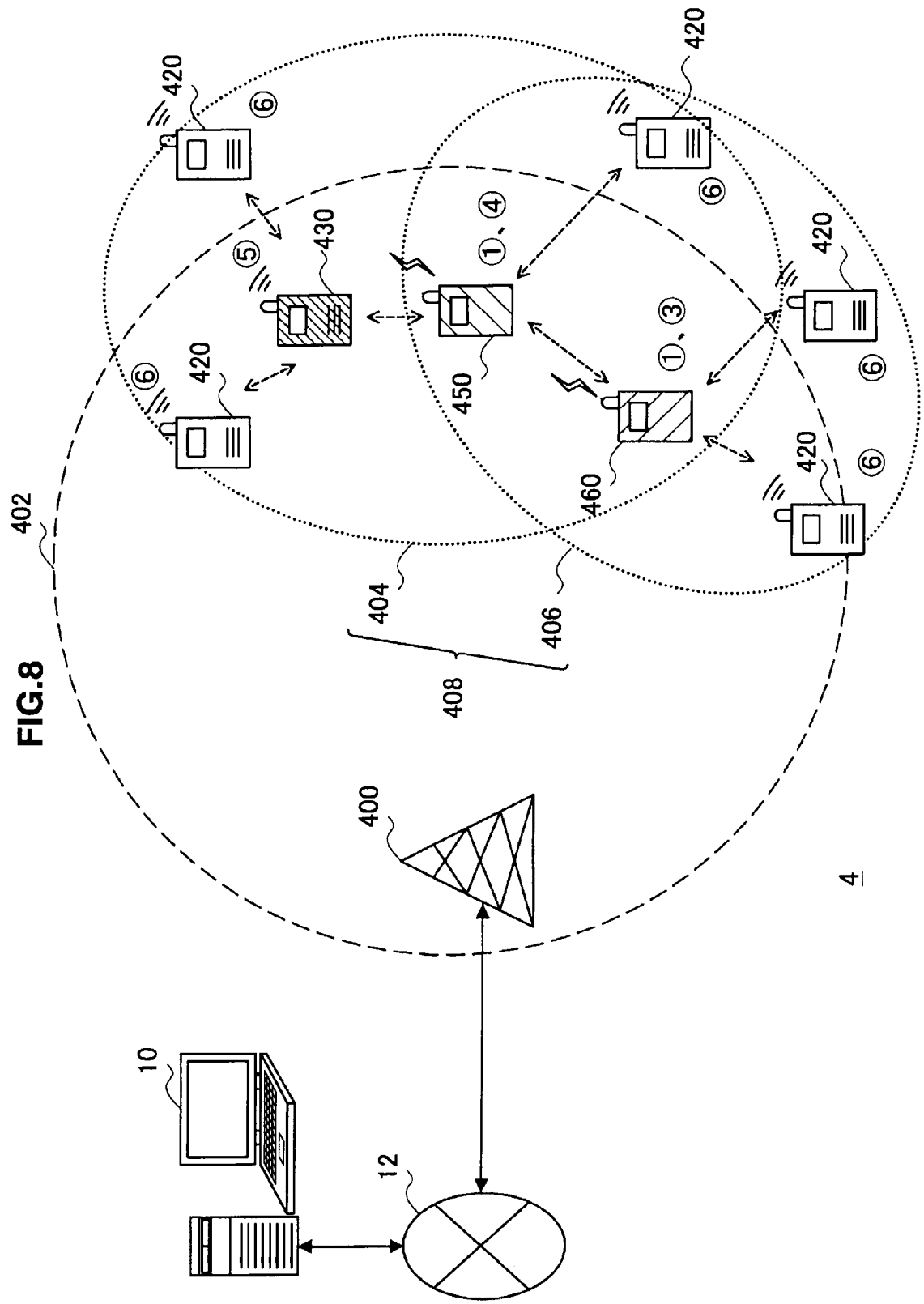
FIG. 8 is a schematic diagram showing a fourth configuration example of a communication system according to one embodiment.

FIG. 8 is a schematic diagram showing a configuration of a communication system 4 according to one embodiment of the present invention. Further, FIG. 9 is a block diagram showing an example of a functional layout between devices in the communication system 4 shown in FIG. 8.

Referring to FIG. 8, the communication system 4 includes a server 10, a base station 400, five sensor devices 420, a smart sensor device 430, a determination device 450, and an advanced determination device 460. Further, the base station 400 is connected to the server 10 through a network 12, which is a wired network.

The base station 400 can provide the first communication service to the devices located inside an area 402.

Figure 9:
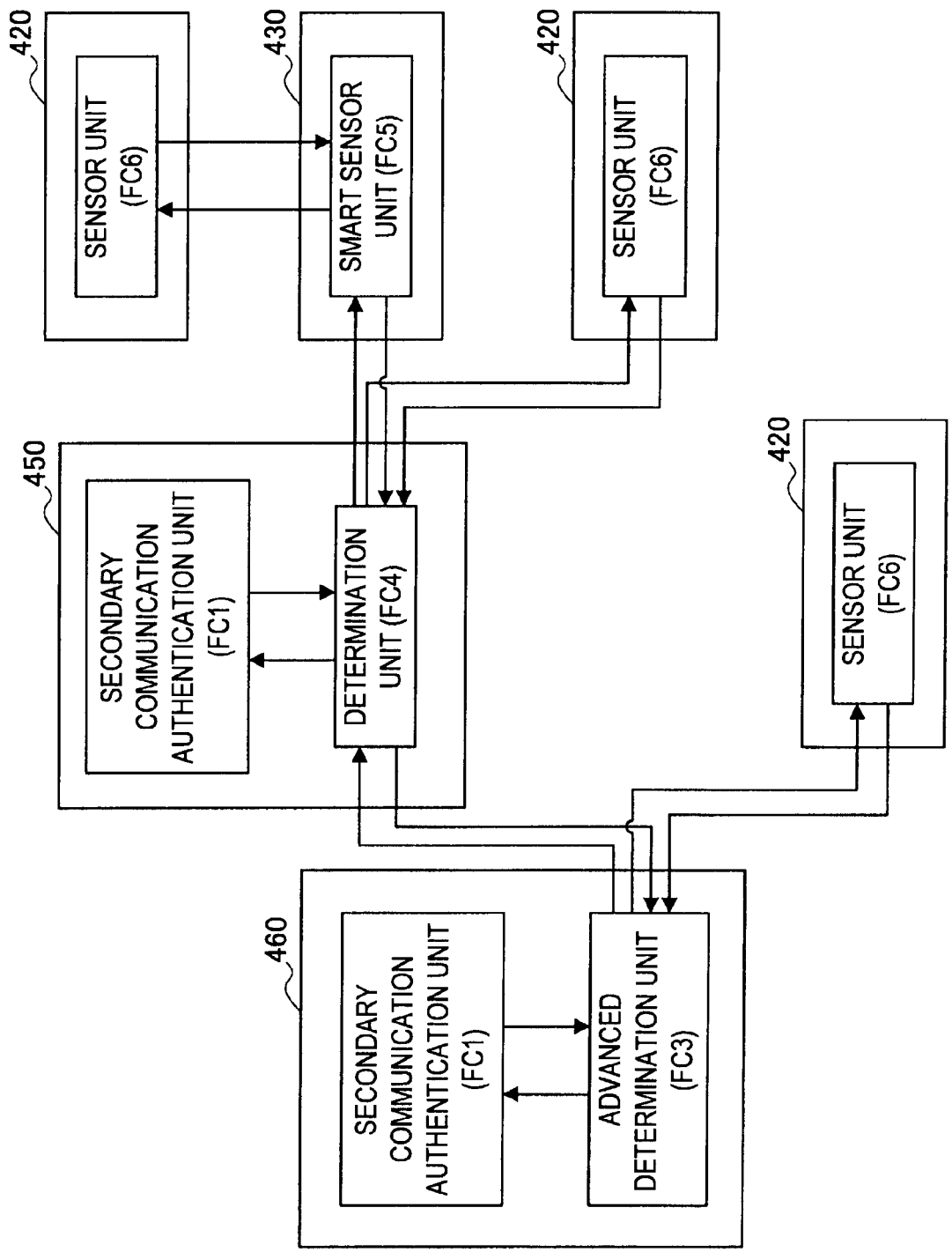
FIG. 9 is a block diagram showing an example of a functional layout in the communication system of FIG. 8.

On the other hand, as shown in FIG. 9, the sensor devices 420 operate as the sensor node (FC6) described above. Specifically, the sensor devices 420 sense the communication environment surrounding their own devices, generate sensed data, and transmit the generated sensed data to the smart sensor device 430, the determination device 450 or the advanced determination device 460.

The smart sensor device 430 operates as the smart sensor node (FC5) described above. Specifically, in response to an instruction from the determination device 450, the smart sensor device 430 acquires sensed data from the sensor devices 420 in the nearby vicinity of its own device. Further, the smart sensor device 430 adds sensed data obtained by sensing the surrounding communication environment of its own to the acquired data. Then, the smart sensor device 430 transmits the sensed data to the determination device 450.

The determination device 450 operates as the permanent secondary communication authentication node (FC1) and the determination node (FC4) described above. Specifically, the determination device 450 can acquire sensed data from the sensor devices 420 and the smart sensor device 430 in the nearby vicinity of its own device. Further, the determination device 450 determines whether secondary usage of a spectrum is available or not based on the acquired sensed data. Then, when the determination device 450 determines that secondary usage of a spectrum is available, the determination device 450 starts providing the second communication service to communication devices located in the nearby vicinity of its own device (e.g. an area 404). Further, in response to a request from the advanced determination device 460, the determination device 450 creates a secondary communication profile containing the acquired sensed data, link data calculated from the sensed data, the spectrum policy or the like and transmits the profile to the advanced determination device 460. The secondary communication profile transmitted herein is used for determination about the availability of extension of the second communication network by the advanced determination device 460, which is described later.

The advanced determination device 460 operates as the permanent secondary communication authentication node (FC1) and the advanced determination node (FC3) described above. Specifically, the advanced determination device 460 first gives an instruction for transmitting the secondary communication profile to the determination device 450. The advanced determination device 460 then determines whether extension of the second communication network is available or not based on the secondary communication profile received from the determination device 450. Then, when the advanced determination device 460 determines that extension of the second communication network is available, the advanced determination device 460 starts providing the second communication service with the extended network range to communication devices located in the nearby vicinity of its own device and the determination device 450.

By such a configuration of the communication system 4, the second communication service can be provided in an area 408 including the areas 404 and 406 by using an unused part (or whole) of the spectrum assigned to the first communication service. Because the advanced determination device 460 and the determination device 450 provide the second communication service in collaboration with each other, the service area of the second communication service is extended. Note that, in this embodiment, the determination device 450 and the advanced determination device 460 may be located outside the area 402 where the first communication service is provided.

As shown in FIG. 2 to FIG. 9, depending on the configuration of the communication system that makes secondary usage of a spectrum, the secondary communication authentication node and the determination node (or the advanced determination node) may be the same communication device or different communication devices. Further, there is a difference in the type of communication profile (wired or wireless etc.) available between the secondary communication authentication node and the determination node, for example. Furthermore, the accuracy of data that is used for determination about the availability of secondary usage of a spectrum by the determination node differs depending on the range to sense a communication environment. In view of these, according to a communication control process described in the following section, secondary usage of a spectrum can be started (or extended) without causing an adverse effect on the first communication service when the communication system has any of the above-described system configurations.

4. Flow of Communication Control Process

Figure 10:
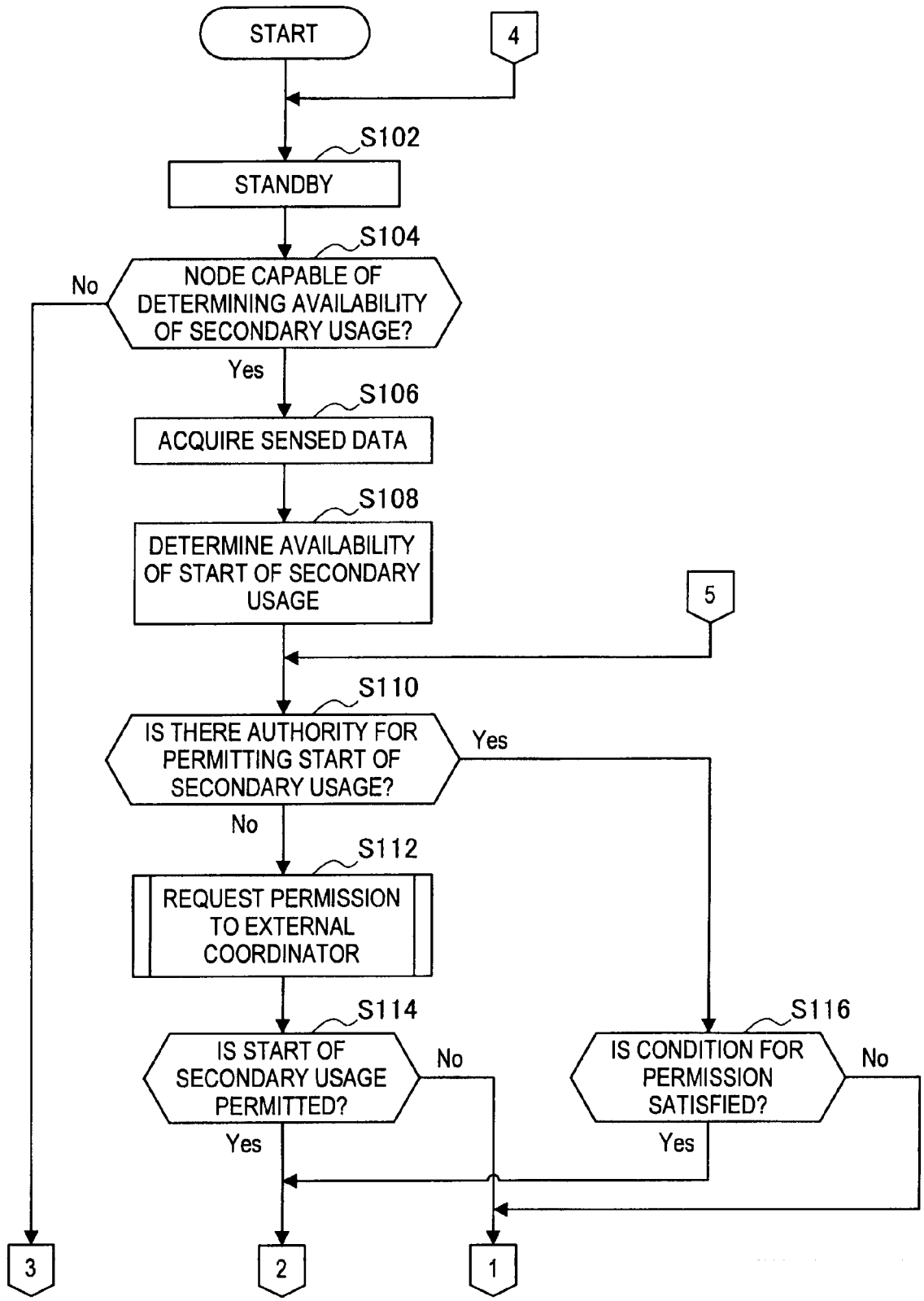
FIG. 10 is a first part of a flowchart showing a communication control process according to one embodiment.
Figure 11:
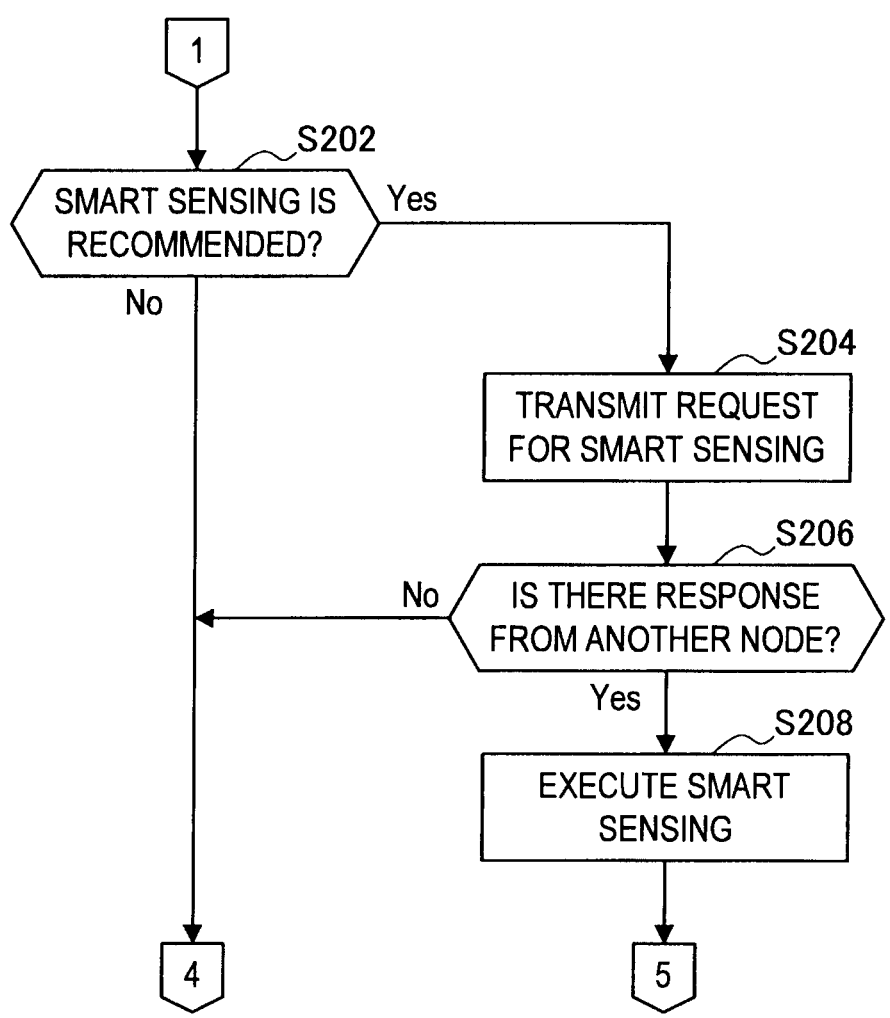
FIG. 11 is a second part of a flowchart showing a communication control process according to one embodiment.
Figure 12:
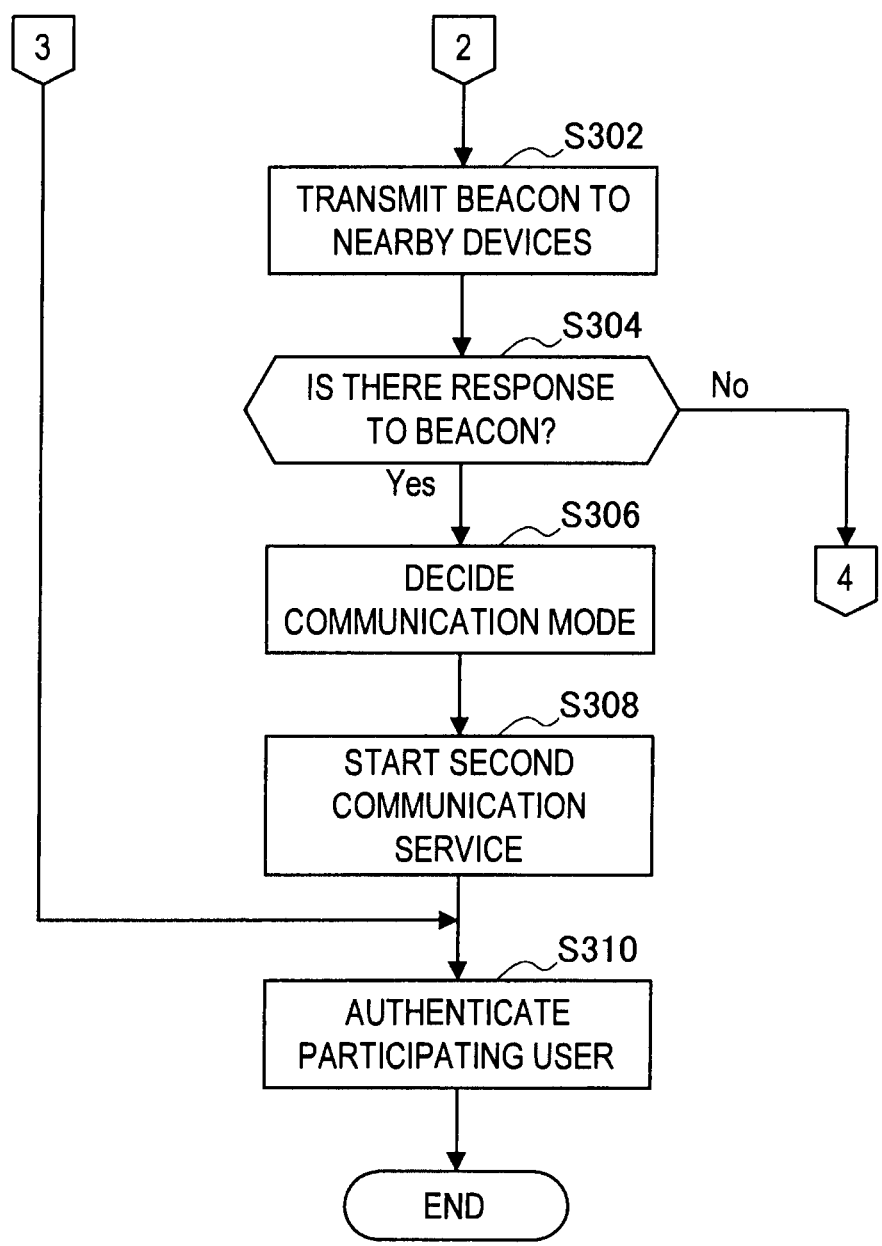
FIG. 12 is a third part of a flowchart showing a communication control process according to one embodiment.

FIG. 10 to FIG. 12 are flowcharts showing a communication control process for starting secondary usage of a spectrum according to one embodiment of the present invention.

Referring to FIG. 10, a communication device in the standby (wait) state first generates a request for secondary usage of a spectrum in response to an operation by a user, an instruction from an application or the like, for example, and the request is detected (S102).

Next, a communication system that has detected the request for secondary usage checks whether or not its own device has a function as the determination node capable of determining the availability of secondary usage (S104). At this time, when the device does not have the function as the determination node, the process proceeds to S310 in FIG. 12. On the other hand, when the device has the function as the determination node, the process proceeds to S106.

In S106, the communication device that has the function as the determination node (which is referred to hereinafter as the determination device) acquires sensed data about a communication environment surrounding its own device (S106). For example, in the communication system 1 shown in FIG. 2, the base station 100 can sense the communication environment inside the area 102 by transmitting and receiving radio signals with the communication devices 110. Further, in the communication system 3 shown in FIG. 6, the determination device 340 can sense the communication environment inside the area 304 by transmitting and receiving radio signals with the sensor devices 320.

Then, the determination device determines whether start of secondary usage of a spectrum is available or not based on the acquired data about the communication environment (S108). Specifically, the determination device determines that secondary usage of a spectrum is available if a parameter such as a power level contained in the acquired data or a parameter such as a noise ratio or an error rate obtained by analyzing the acquired data satisfies the above-described condition for availability.

Then, the determination device checks whether its own device has authority for permitting the availability of secondary usage (S110). Specifically, in this step, it is checked whether the determination device has a function as the secondary communication authentication node capable of permitting secondary usage of a spectrum also. For example, the base station 100 shown in FIG. 2 and the determination device 340 shown in FIG. 6 are the determination node but not the secondary communication authentication node. Therefore, because the determination node does not have authority for permitting secondary usage, the process proceeds to S112. On the other hand, the base station 200 shown in FIG. 4 and the determination device 450 shown in FIG. 8 are both the determination node and the secondary communication authentication node. Therefore, because the determination node has authority for permitting secondary usage, the process proceeds to S116. Note that, in the communication system 3 shown in FIG. 6, for example, when the determination device 340 receives authority for permitting secondary usage of a spectrum temporarily from the base station 300, the determination device 340 can operate as the temporary secondary communication authentication node, and therefore the process proceeds to S116.

In S112, the determination device transmits a message requesting permission for secondary usage of a spectrum to an external coordinator, which is the secondary communication authentication node (S112). In this step, the determination device transmits the acquired sensed data about the communication environment (and a result of analyzing the sensed data) together with the message, for example. After that, when the received data satisfies the above-described specific condition for permission, the secondary communication authentication node (for example, the server 10 shown in FIG. 2 or the base station 300 shown in FIG. 6) permits start of the second communication service. Note that a selection process of a communication protocol that is used by the determination device to communicate with the secondary communication authentication node in S112 is further described later.

Then, the determination device determines whether start of the second communication service is permitted or not by the secondary communication authentication node (S114). When start of the second communication service is permitted, the process proceeds to S302 in FIG. 12. On the other hand, when start of the second communication service is not permitted, the process proceeds to S202 in FIG. 11.

Further, in S116, the determination device serving also as the secondary communication authentication node determines whether start of the second communication service is permissible or not in accordance with the condition for permission which is the same as in S112 based on the sensed data about the communication environment and the analysis result described above (S116). The determination device serving also as the secondary communication authentication node corresponds to the base station 200 shown in FIG. 4 or the determination device 450 shown in FIG. 8, for example. When it is determined that start of the second communication service is permissible, the process proceeds to S302 in FIG. 12. On the other hand, when it is determined that start of the second communication service is not permissible, the process proceeds to S202 in FIG. 11.

In S202 of FIG. 11, the determination device determines whether sensing of a communication environment by a plurality of communication devices, which is smart sensing, is recommended or not (S202). For example, even if sensed data about a communication environment does not satisfy the above-described condition for permission, when it can be predicted that a good sensing result is obtained by smart sensing, the secondary communication authentication node can allow secondary usage of a spectrum on the premise of smart sensing. For example, when the energy of radio signals contained in the sensed data is unstable but satisfies the above-described condition for permission depending on time, it can be predicted that a good sensing result is obtained by smart sensing. In this case, the secondary communication authentication node recommends smart sensing to the determination device in order to make determination about permission for secondary usage by using sensed data which is enhanced by smart sensing. At this time, the secondary communication authentication node may indicate a parameter for executing smart sensing (e.g. a spectrum mask, a transmission power, a transmission time, a transmission interval etc.) in addition. At the time of deciding a parameter for executing smart sensing and transmitting a smart sensing request, which is described later, it is preferred to select a parameter that is instantaneous and has no effect on the first communication system as much as possible. Specifically, the determination device may decide a transmission power level Pt as Pt>Pr on the basis of a received power level Pr for each band sensed using the sensing function of its own, and transmit the smart sensing request. At this time, a band indicating a power level of lower than the received power level Pr may be selected as a transmission channel band according to the amount of data of parameter information. When smart sensing is recommended in S202, the process proceeds to S204. On the other hand, when smart sensing is not recommended in S202, because it is unable to start secondary usage of a spectrum, the determination device enters the standby state again (S102).

In S204, the determination device makes beaconing (regular transmission) of a request for smart sensing (smart sensing request) to communication devices in the nearby vicinity according to the indicated parameter (S204). For example, in the communication system 2 shown in FIG. 4, the base station 200 as the determination node can transmit the smart sensing request to the smart sensor device 230. Further, in the communication system 3 shown in FIG. 6, the determination device 340 can transmit the smart sensing request to the smart sensor device 330. Note that when the determination device receives the similar smart sensing request from another communication device, the determination device may execute smart sensing in collaboration with the communication device.

Then, the determination device determines whether a response to the smart sensing request is received from a communication device in the nearby vicinity (S206). When the response is received from a communication device in the nearby vicinity, the process proceeds to S208. On the other hand, when the response is not received from a communication device in the nearby vicinity, the determination device is unable to execute smart sensing and thus unable to start secondary usage of a spectrum, and therefore the determination device enters the standby state again (S102).

In S208, the determination device executes smart sensing with a communication device having responded to the smart sensing request, which is a smart sensing device (S208). Specifically, the determination device first synchronizes a physical link and a communication protocol used for smart sensing with the smart sensing device. More specifically, the synchronization may be made according to a communication parameter decided by prior negotiation between the determination device and the smart sensing device, for example. Further, each device may detect a preamble automatically and makes synchronization by referring to header information of a subsequent received packet. Further, a transmission parameter may be set to a blind state, and a device at the receiving end may automatically estimate a received parameter. Then, the determination device directs the smart sensing device to sense a communication environment and receives a sensing result. The sensed data about the communication environment is thereby acquired for a wider range (or with a higher accuracy). After that, based on the sensed data acquired by smart sensing, secondary usage of a spectrum is permitted in the process from S110 to S116, and then the process proceeds to S302 in FIG. 12.

In S302 of FIG. 12, the determination device that has received permission for start of secondary usage of a spectrum transmits beacons for inviting users to participate in the second communication service to communication devices in the nearby vicinity (S302). At this time, a parameter for the second communication service that is decided according to the spectrum policy (e.g. a spectrum mask, a transmission power, a transmission time, a transmission interval etc.), for example, can be indicated using the beacons.

Then, after the lapse of a certain length of time, for example, the determination device determines whether it has received a response to the above-described beacons from a communication device in the nearby vicinity (S304). When a response is received from a communication device in the nearby vicinity, the process proceeds to S306. On the other hand, when a response is not received from a communication device in the nearby vicinity, because there is no user to participate in the second communication service, the determination device enters the standby state again (S102).

In S306, the determination device decides a communication mode to be used for the second communication service according to capability information (which represents a protocol to support, a modulation method or the like) of participants to the second communication service which is contained in the response to the beacon, for example (S306). At this time, it is preferred that the determination device decides a communication mode that can make the most efficient utilization of a spectrum to use. Note that when a communication mode to be used for the second communication service is predefined between communication devices, S306 may be skipped.

Then, when the communication mode to be used for the second communication service is decided, the second communication service is started between the determination device and the participant to the second communication service (S308). After that, authentication of participating users is performed (S310), for example, and a communication is performed between users by using a part or whole of a spectrum assigned to the first communication service. In this step, a communication device that has been unable to determine the availability of secondary usage of a spectrum in S104 of FIG. 10, for example, may participate in the second communication service as a user at the point of S310, for example.

It should be noted that a procedure for the determination device to start the second communication service is mainly described in FIG. 10 to FIG. 12. However, the communication control process described with reference to FIG. 10 to FIG. 12 may be applied in the same manner to a procedure for the advanced determination device 460 shown by way of illustration in FIG. 8 to extend the second communication service.

5. Selection of Communication Protocol Prior to Start of Secondary Usage

At the point of a communication between the determination device and an external coordinator in S112 of FIG. 10 and communication for smart sensing in FIG. 11 described above, the second communication service is not yet started. Therefore, what communication protocol is used for a communication between the respective devices is described hereinbelow.

[5-1. Communication Protocol between Determination Device and External Coordinator]

Figure 13:
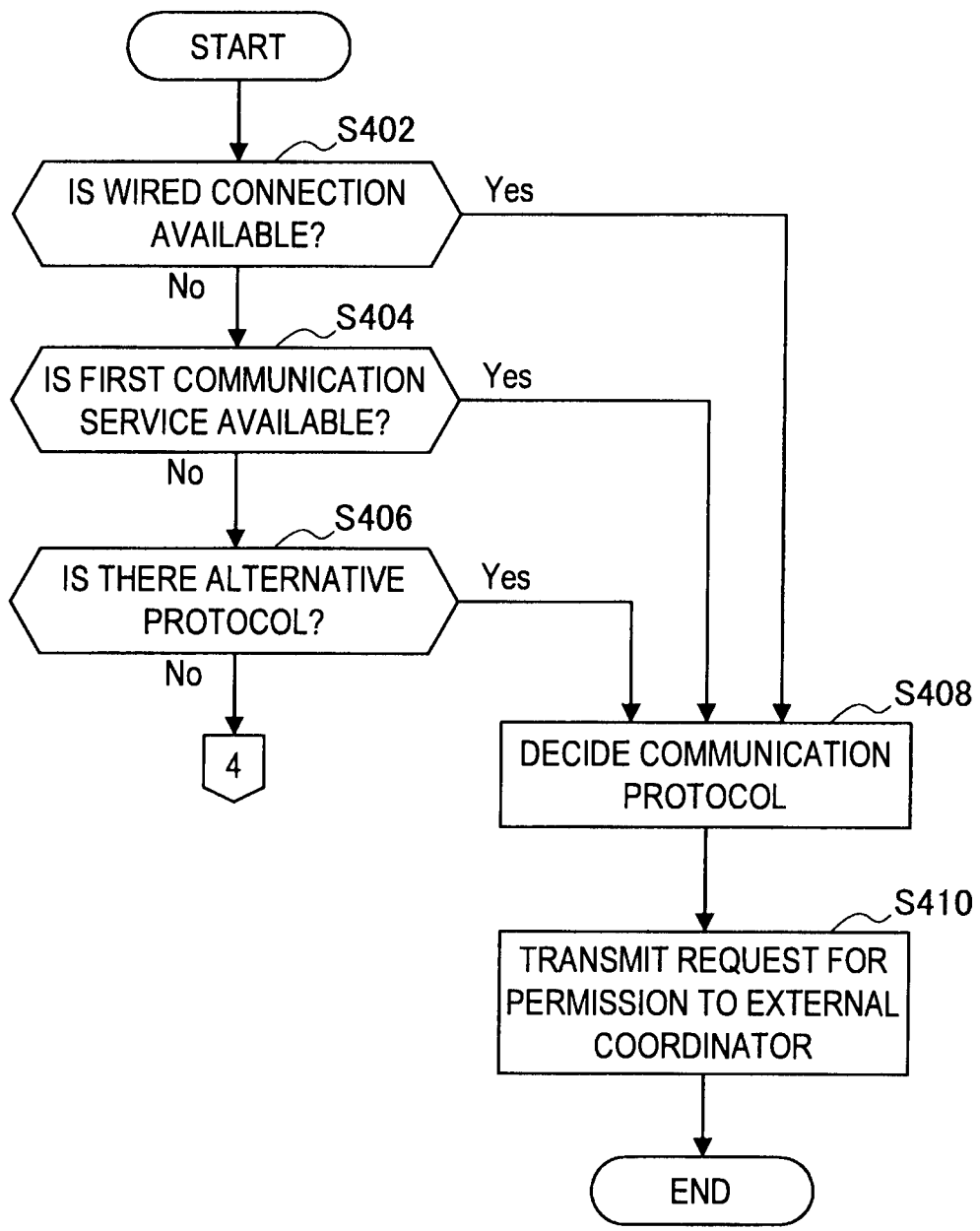
FIG. 13 is a flowchart showing a selection process of a communication protocol according to one embodiment.

FIG. 13 is a flowchart showing an example of a selection process to select a communication protocol to be used when the determination device makes a request for permitting secondary usage of a spectrum to an external coordinator in S112 of FIG. 10.

Referring to FIG. 13, the determination device first determines whether wired connection is available with an external coordinator, which is the secondary communication authentication node (S402). The base station 100 shown in FIG. 2, for example, is able to use wired connection through the network 12 with the server 10. In this case, in S408, the determination device decides to use a communication protocol for using wired connection (e.g. Ethernet (registered trademark), FDDI etc.). On the other hand, the determination device 340 shown in FIG. 6, for example, is unable to use wired connection with the base station 300. In this case, the process proceeds to S404.

In S404, the determination device determines whether it is able to communicate with the external coordinator by the first communication service (S404). The determination device 340 shown in FIG. 6, for example, is able to communicate with the base station 300 by the first communication service. In this case, the determination device decides to use a communication protocol related to the first communication service in S408. On the other hand, when it is unable to communicate with the external coordinator by the first communication service, the process proceeds to S406.

In S406, the determination device determines whether there is an alternative communication protocol that allows a communication with the external coordinator (S406). When there is an alternative communication protocol, the determination device decides to use the communication protocol in S408. On the other hand, when there is no alternative communication protocol, the determination device returns to the standby state because it is unable to gain permission for secondary usage of a spectrum.

When the communication protocol is decided in the above manner, the determination device transmits a message requesting permission for secondary usage of a spectrum to the external coordinator as described above by using the decided communication protocol (S410).

[5-2. Communication Protocol for Smart Sensing]

At the communication for smart sensing in FIG. 11, it is preferred to use a hierarchical management communication protocol according to control of a higher-order node between nodes at different levels in the function classifications FC1 to FC7, for example. The hierarchical management communication protocol may be Zigbee or the like, for example. When transmitting an instruction for sensing of a communication environment from the determination device to the smart determination device, for example, a hierarchical management communication protocol such as Zigbee may be used according to control of the determination device, which is a higher-order node. When using the hierarchical management communication protocol, data exchange is performed between transmitting and receiving devices by using a transmitting and receiving interval which is managed by a coordinator (a coordinator of secondary usage, which is different from the secondary communication authentication node) and for which bandwidth reservation has been previously made. For example, in the above-described Zigbee, on the basis of a beacon managed by the coordinator, a time slot which is a contention free period and a time slot which is a contention access period are placed. Then, between devices that perform a communication using the time slot in the contention access period, the opportunity of transmission is adjusted by its own determination so as to avoid contention with a transmission packet of another device. In this case, in order to know the timing to avoid contention, each device is necessary to receive a reference beacon that is transmitted from the coordinator and, accordingly, conforms to the hierarchical management communication protocol.

On the other hand, when transmitting and receiving sensed data between smart sensing devices, for example, an autonomous distributed communication protocol such as IEEE802.11s or WiMedia may be used. In the autonomous distributed communication protocol, because a coordinator does not exist at the transmission and reception of packets, data exchange is performed between transmitting and receiving devices by adjusting the opportunity of transmission by its own determination so that collision does not occur with a transmission packet from another device. Alternatively, a hierarchical management communication protocol such as Zigbee may be used according to control of a device that has transmitted the beacon first. If the autonomous distributed communication protocol is used between nodes at the same level in the above-described function classifications FC1 to FC7, it is possible to easily change the topology between devices performing smart sensing in accordance with the location of the devices.

6. Example of Data Transmitted and Received between Nodes

In the communication control process according to one embodiment described above, data transmitted and received between nodes includes two types of data when broadly classified: sensed data and control data.

[6-1. Sensed Data]

The sensed data is data related to a communication environment that is sensed by the sensor node or the smart sensor node described above. A communication resource as a target of sensing by the sensor node or the smart sensor node is a communication resource that is likely to be used by the first communication service, and it can be set in units of frequency channels, resource blocks or codes, for example. In what range of communication resource should be a target of sensing may be decided by observing a broadcast channel (PBCH (Physical Broadcast CHannel) in LTE etc.) in the downlink of the first communication service, for example. The sensed data may contain, in addition to an identifier of a device which has sensed a communication environment and a sensing result, location data of a device acquired using a GPS (Global Positioning System), a kind of a sensing algorithm, a time stamp or the like. Further, an analysis result that is obtained by analyzing the sensed data and scheduling information indicating a surrounding communication environment for the first communication service can be contained in the sensed data in a broad sense.

The location data of a device is data indicating the location of a device which has sensed a communication environment at the time of sensing, for example. The location data is used for determination about the availability of secondary usage of a spectrum by the determination node (or the advanced determination node), for example. Specifically, the determination node downloads a location information database which is prepared externally (e.g. the server 10 etc.) in advance to its own device, for example. The database contains channel assignment of the first communication service, channel usage history or the like in association with the location data. Thus, the determination node can retrieve the channel assignment or the channel usage history from the location information database by using the location data as a key, for example, and thereby evaluate the possibility that the secondary usage causes an adverse effect on the first communication service. Instead of downloading the location information database to its own device in advance, the determination node may make inquiry to an external database by using the location data as a key at the time of determining the availability of secondary usage, for example.

The kind of a sensing algorithm indicates what kind of value is to be sensed (or have been sensed), such as radio signal energy, a noise power level, a noise ratio (e.g. SNR or CNR) or an error rate (e.g. BER or PER), for example.

The sensing result contains the value of the sensing result according to the kind of the sensing algorithm described above. The value of the sensing result may be represented by soft bit (soft decision value) or hard bit (hard decision value).

For example, it is preferred that the determination node (or the advanced determination node) represents the sensing result to be transmitted to the secondary communication authentication node by hard bit. In this case, a result of determining the availability of secondary usage or the like according to the sensed value is represented by a logical value such as "0" or "1". This enables a decrease in traffic between nodes. On the other hand, the sensing result to be transmitted from the sensor node (or the smart sensor node) to the determination node (or the advanced determination node) is typically represented by soft bit.

The time stamp contains time when sensing of a communication environment is started, time when sensing of a communication environment ends or the like, for example.

[6-2. Control Data]

The control data is data to be used in order that the above-described one node constituting the secondary usage system controls another node or one node is controlled by another node. The control data may contain an instruction for start or stop of sensing, an instruction for transmission of sensed data, an indication of a kind of a sensing algorithm, an instruction for transmission of a secondary communication profile, a request for access to a location information database or the like, for example.

Further, when the advanced determination node, the determination node or the smart sensor node integrates sensed data acquired from a plurality of nodes, information indicating by what method the sensed data is integrated, such as averaging or standard deviation, for example, may be contained in the control data.

Further, the secondary communication authentication node, the advanced determination node or the determination node may evaluate the reliability of each sensed data by comparing sensed data sensed or acquired by one node with sensed data sensed or acquired by another node. For example, when there is a large variation among sensing results sensed or acquired by a plurality of nodes located in the nearby vicinity, the reliability of the sensed data can be evaluated to be low. In such a case, the evaluation result of the reliability of the sensed data is contained in the control data. Further, a node in the state of a hidden terminal may be detected by comparing sensed data sensed or acquired by one node with sensed data sensed or acquired by another node.

Furthermore, the smart sensor node may exchange control data such as the upper limit of the allowable number of hops and the allowable number of sensor nodes and the minimum required number of sensor nodes with another smart sensor node. This enables extension of a sensing area of smart sensing with the quality of sensed data kept at a certain level.

7. Summary

The communication control process according to an embodiment of the present invention is described above with reference to FIG. 1 to FIG. 13. According to the communication control process, data related to a communication environment surrounding the determination node is acquired, and when the acquired data satisfies the above-described condition for availability (first condition), it is determined that secondary usage of a spectrum is available. Then, in the secondary communication authentication node located in the same communication device as or a different communication device from the determination node, when data related to a communication environment satisfies the above-described condition for permission (second condition), secondary usage of a spectrum is permitted. It is thereby possible to start (or extend) secondary usage of a spectrum after appropriately determining that there is no adverse effect on the first communication service in various system configurations that implement secondary usage of a spectrum.

Further, when data related to a communication environment does not satisfy the above-described condition for permission, sensing of a communication environment by a plurality of communication devices, which is smart sensing, is recommended from the secondary communication authentication node to the determination node. Consequently, even when an effect on the first communication service is not appropriately determined from sensed data by a single device, an effect on the first communication service can be determined using sensed data enhanced by smart sensing.

Further, when usage of the second communication service is permitted, beacons for inviting users to participate in the second communication service are transmitted from the determination node to communication devices in the nearby vicinity. Then, based on information (e.g. capability information described above) contained in a response to the beacon, a communication mode to be used for the second communication service is decided. It is thereby possible to promptly select the optimum communication mode and start the second communication service.

The subject matter of each embodiment described in this specification is applicable to various types of modes of secondary usage as described above. For example, as described above, it can be said that operation of relay node or femto-cell to cover a spectrum hole of the first communication service is a mode of secondary usage of spectrum. Further, the relationship between macro-cell, RRH (Remote Radio Head), Hotzone, relay node, femto-cell and the like that use a common spectrum to each other may form a mode of secondary usage of spectrum (such as heterogeneous network).

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 1, 2, 3, 4 Communication system
10 Server (Second communication device)
100, 200 Base station (First communication device)
300 Base station (Second communication device)
340, 450 Determination device (First communication device)
460 Advanced determination device (First communication device)
120, 220, 222, 320, 322, 420 Sensor device
230, 330, 430 Smart sensor device

The invention claimed is:

1. A communication control method comprising the steps of:
    acquiring data related to a communication environment surrounding a first communication device at the first communication device;
    determining that a second communication service using a part or whole of a spectrum assigned to a first communication service is available when the acquired data related to the communication environment satisfies a first condition; and
    permitting usage of the second communication service when the data related to the communication environment satisfies a second condition at the first communication device or a second communication device,
    wherein when the data related to the communication environment does not satisfy the second condition, sensing of a communication environment by a plurality of communication devices is recommended to the first communication device.

2. The communication control method according to claim 1, wherein
    when usage of the second communication service is permitted, a beacon for inviting a user to participate in the second communication service is transmitted from the first communication device to nearby communication devices.

3. The communication control method according to claim 2, wherein
    when a response to the beacon is received, a communication mode to be used for the second communication service is decided by the first communication device based on information contained in the response.

4. The communication control method according to claim 1, wherein
    when the second communication device has authority to permit usage of the second communication service, the data related to the communication environment is transmitted from the first communication device to the second communication device.

5. The communication control method according to claim 4, wherein
    when wired connection is available between the first communication device and the second communication device, the data related to the communication environment is transmitted using the wired connection.

6. The communication control method according to claim 4, wherein
    when a communication is possible using the first communication service between the first communication device and the second communication device, the data related to the communication environment is transmitted using the first communication service.

7. The communication control method according to claim 1, wherein
    in the step of permitting, reliability of the data related to the communication environment is evaluated by comparing the data related to the communication environment with a communication history in the first communication service, and usage of the second communication service is permitted according to an evaluation result of the reliability.

8. The communication control method according to claim 1, wherein
    in the step of permitting, it is verified that a communication device to use the second communication service is not a device that has performed an unauthorized act in the spectrum assigned to the first communication service in past times, and usage of the second communication service is permitted according to a result of the verification.

9. A communication device comprising:
    a determination unit that determines that a second communication service using a part or whole of a spectrum assigned to a first communication service is available when data related to a communication environment surrounding its own device satisfies a first condition,
    wherein the determination unit, when determining that the second communication service is available, makes a request for permitting usage of the second communication service to a device having authority to permit usage of the second communication service based on the data related to the communication environment satisfying a second condition, wherein when the data related to the communication environment does not satisfy the second condition, the communication device receives a recommendation from the device to sense a communication environment by a plurality of communication devices.

10. The communication device according to claim 9, wherein when usage of the second communication service is permitted, the communication device transmits a beacon for inviting a user to participate in the second communication service to nearby communication devices.

11. The communication device according to claim 10, wherein when a response to the beacon is received, the communication device decides a communication mode to be used for the second communication service based on information contained in the response.

12. The communication device according to claim 9, wherein when wired connection is available between the communication device and the device having authority to permit usage of the second communication service, the data related to the communication environment is transmitted using the wired connection.

13. The communication device according to claim 9, wherein when a communication is possible using the first communication service between the communication device and the device having authority to permit usage of the second communication service, the data related to the communication environment is transmitted using the first communication service.

14. The communication device according to claim 9, wherein the device having authority to permit usage of the second communication service permits the usage of the second communication service according to an evaluation result of evaluating a reliability of the data related to the communication environment by comparing the data related to the communication environment with a communication history in the first communication service.

15. The communication device according to claim 9, wherein the device having authority to permit usage of the second communication service permits the usage of the second communication service according to a verification result of a verification that the communication device is not a device that has performed an unauthorized act in the spectrum assigned to the first communication service in past times.

16. A non-transitory computer-readable medium having embodied thereon a program, which when executed by a computer controlling a communication device causes the computer to perform a method, the method comprising:

determining that a second communication service using a part or whole of a spectrum assigned to a first communication service is available when data related to a communication environment surrounding the communication device satisfies a first condition; and requesting, when the second communication service is determined to be available, a permission for usage of the second communication service from a device having authority to permit usage of the second communication service based on the data related to the communication environment satisfying a second condition, wherein when the data related to the communication environment does not satisfy the second condition, the communication device receives a recommendation from the device to sense a communication environment by a plurality of communication devices.

* * * * *